A. B. SCHOFIELD, DEC'D.
B. W. SCHOFIELD, EXECUTRIX.
WIRE CUTTER.
APPLICATION FILED SEPT. 11, 1907.

955,287.

Patented Apr. 19, 1910.

Witnesses:-
M. Gruber
F. George Barry.

Inventor
Albert B. Schofield, deceased,
Bertha W. Schofield, Executrix,
by attorneys
Brown & Seward

ANDREW B. GRAHAM CO., PHOTO-LITHOGRAPHERS, WASHINGTON, D.C.

UNITED STATES PATENT OFFICE.

BERTHA W. SCHOFIELD, OF NEW YORK, N. Y., EXECUTRIX OF ALBERT B. SCHOFIELD, DECEASED.

WIRE-CUTTER.

955,287. Specification of Letters Patent. Patented Apr. 19, 1910.

Application filed September 11, 1907. Serial No. 392,248.

*To all whom it may concern:*

Be it known that ALBERT B. SCHOFIELD, late a citizen of the United States, deceased, of whose last will and testament I, BERTHA W. SCHOFIELD, a citizen of the United States, and resident of the borough of Brooklyn, in the city and State of New York, am executrix, did invent a new and useful Improvement in Wire-Cutters, of which the following is a specification.

The invention relates to wire cutters with the object in view of providing a simple, durable and effective tool of great power.

A practical embodiment of the invention is represented in the accompanying drawings in which—

Figure 1:
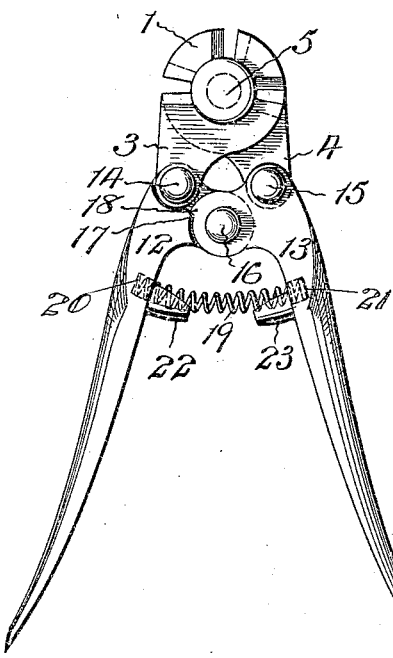
Figure 2:
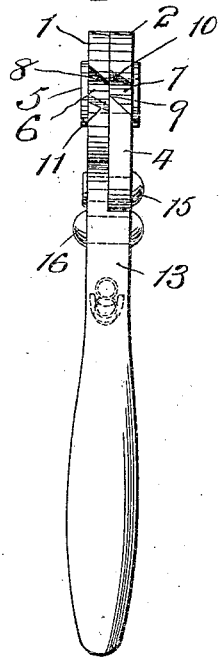
Figure 4:
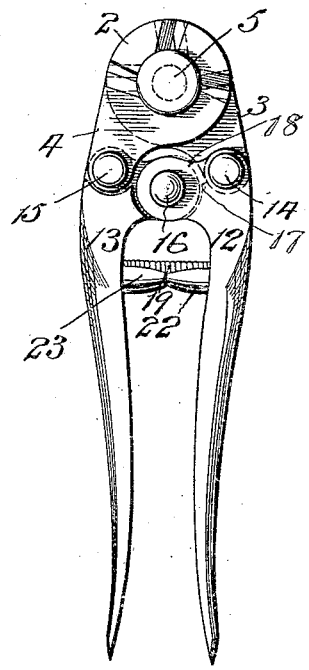
Figure 3:
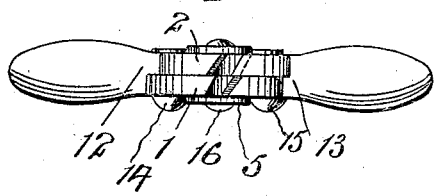

Figure 1 is a view of the tool in elevation showing it in its normal open position for receiving a wire to be cut. Fig. 2 is an edge view of the same, Fig. 3 is an end view of the same, and Fig. 4 is a view in side elevation showing the parts in their closed position.

The cutting jaws are denoted by 1 and 2. Their shape is that of circular disks, the peripheries thereof being extended at one portion thereof to form shanks 3 and 4. These cutting jaws 1 and 2 are pivotally secured together by a central pintle 5. The jaws are provided at intervals with diagonal slots, in the present instance three sets of slots being shown, one at the extreme end and one on each of two opposite sides about a quadrant's distance apart. A description of one set of slots will suffice for the three as they are repetitions of one another.

Referring to Fig. 2, the diagonal slot in the jaw 1 is denoted by 6 and that in the jaw 2 by 7. The diagonal arrangement of the slots produces a sharp cutting edge 8 on the jaw 1 adjacent to the jaw 2 and a sharp cutting edge 9 on the jaw 2 adjacent to the jaw 1. As the wire is laid between the two cutting edges and the jaws 1 and 2 rocked, these two cutting edges 8 and 9 approach each other and sever the wire. The relation of the two slots 6 and 7 is such that the wire passing through the slots transverse to the plane of the cutting jaws, will have a certain space 10 in the jaw 1 overlapping the edge 8 and a space 11 in the jaw 2 overlapping the edge 9, thereby leaving the edges 8 and 9 perfectly free to enter the wire at the very beginning of the cut. The jaws 1 and 2 have the ends of their shanks 3 and 4 pivoted to operating handles denoted respectively by 12 and 13, the connection being shown in the present instance as made by riveted pintles 14 and 15.

The handles 12 and 13 are pivotally secured at 16, their free ends being brought toward each other in position to overlap to receive the pintle 16, the pintles 14 and 15 which connect the shanks of the cutting jaws being connected to knuckles on the handles 12 and 13. The handle 12 is provided with a shoulder 17 and the handle 13 with a nose 18 in position to rest against the shoulder 17 when the parts are in their open position to prevent the handles from opening beyond a predetermined position under the expansion of the spring 19. The spring 19 which tends to throw the handles apart, is seated at its opposite ends in sockets 20 and 21 in the adjacent faces of the handles and is retained in position in these sockets without other fastening than its own tension tending to expand and the limiting of the outward throw of the handles by the shoulder 17 and nose 18.

The movement of the handles toward each other is limited by means of lugs 22 and 23 on the inner faces of the handles, which lugs are attached at their ends, as shown at Fig. 4, to prevent the handles being pressed together sufficiently far to punch the hand of the operator.

Claim:

A cutter comprising a pair of handles pivoted together, the parts at the pivotal connection being provided with shoulders arranged to engage to limit the opening of the handles, the said handles being provided on their adjacent faces with projections to limit the closing of the handles, a spring interposed between the handles for holding them normally apart and cutting jaws of disk like form pivotally secured together to rotate relatively to each other and provided with diagonal slots in their curved faces for the reception of a wire to be cut, the said pivotal cutting jaws being provided with tail pieces pivotally secured the one to one of the handles and the other to the other of the handles, substantially as set forth.

BERTHA W. SCHOFIELD,
*Executrix of last will and testament of Albert B. Schofield, deceased.*

Witnesses:
ROBERT K. WALTON,
F. GEORGE BARRY.